3,213,059
PROCESS FOR PREPARATION OF
POLYCARBONATE RESINS
Rudolph D. Deanin, West Hartford, Conn., and Polly Roessel, Morristown, N.J., assignors to Allied Chemical Corporation, New York, N.Y., a corporation of New York
No Drawing. Filed Dec. 29, 1960, Ser. No. 79,186
7 Claims. (Cl. 260—47)

The present invention relates to a process for the preparation of polycarbonate resins by the phosgenation of di-monohydroxyaryl-alkanes in an aqueous alkaline medium, especially the phosgenation of 2,2-(4,4'-dihydroxy-diphenyl)-propane, also known as p,p'-isopropylidene diphenol, hereinafter referred to as Bis-phenol–A.

Polycarbonate resins may be conventionally prepared by reacting together phosgene and Bis-phenol–A in an aqueous alkaline solution. The phosgene is generally slowly and uniformly added to an aqueous alkaline solution containing a reaction catalyst and a solvent for the polycarbonate resin. The catalyst and solvent are employed in order to promote molecular weight growth. The solvent retains the polycarbonate resin in solution where catalyzed molecular weight growth of the resin occurs. If no solvent is employed only low molecular weight polymer is produced and this polymer precipitates from solution substantially as fast as formed. After introduction of the phosgene a molecular weight growth period is preferably employed, during which time the reaction mixture is stirred and growth to higher molecular weight occurs. The resultant polycarbonate resin may be recovered from solution by conventional means, such as the addition of a non-solvent for the polycarbonate resin, thus precipitating the resin.

In the foregoing process it has been found that in order to obtain the desirable higher molecular weights long post-phosgenation stirring periods are required. These long post-phosgenation stirring periods are time-consuming and uneconomical, and yet requisite to higher molecular weight. In addition the post-phosgenation stirring periods do not always provide the desired molecular weights.

Accordingly, it is an object of the present invention to provide a process for the preparation of a polycarbonate resin by the phosgenation of di-monohydroxyaryl-alkanes, especially Bis-phenol–A.

It is a further object of the present invention to inexpensively and expeditiously produce a high molecular weight polycarbonate resin without the necessity of time-consuming and uneconomical long post-phosgenation stirring periods.

It is a still further object of the present invention to provide a process for the production of a polycarbonate resin, utilizing the phosgenation process, which consistently provides rapid growth to the desired molecular weight.

Further objects and advantages of the present invention will appear hereinafter.

In accordance with the present invention it has been found that a polycarbonate resin may be obtained, accomplishing the aforementioned objects of the present invention, by (I) preparing an aqueous alkaline solution containing a di-monohydroxyaryl-alkane and an inert organic solvent immiscible in the aqueous phase, (II) slowly adding phosgene thereto in two portions, with (a) the first portion containing from about 66⅔ to 91⅔ percent of the total amount of phosgene being added at a rate of from about 0.5 to 1.2 mols phosgene per hour per mol di-monohydroxyaryl-alkane;
(b) the second portion containing from about 8⅓ to 33⅓ percent of the total amount of phosgene and being added at a rate of from about 0.04 to 0.4 mol phosgene per hour per mol di-monohydroxyaryl-alkane and, (III) recovering the resulting polycarbonate. The fact that the aforementioned disadvantages of the art can be overcome by the process of the present invention is surprising and unexpected and represents a significant advance.

The phosgene-di-monohydroxyaryl-alkane ratio is not critical. Practically, however, at least 0.1 mole of phosgene is employed per mole of di-monohydroxyaryl-alkane. Theoretically an equimolar ratio of phosgene to di-monohydroxyaryl-alkane is required for complete conversion of the di-monohydroxyaryl-alkane to polycarbonate; however, in order to compensate for loss of phosgene by side reactions, the normal operation utilizes more than one mole of phosgene per mole of di-monohydroxyaryl-alkane. It has been found that the preferred ratio is from about 1.1 to about 1.5 moles of phosgene per mole of di-monohydroxyaryl-alkane. If less than one mole of phosgene is employed, correspondingly less of the di-monohydroxyaryl-alkane will be converted to polycarbonate. If too much phosgene is employed the extra phosgene will merely be unconsumed.

It should be noted that the phosgene waste and di-monohydroxyaryl-alkane waste are related, since when phosgene is wasted by side reactions there will be less phosgene available to react with the di-monohydroxyaryl-alkane, increasing the tendency on the part of the latter to remain unreacted.

In accordance with the present invention the phosgene is slowly added to an aqueous alkaline solution containing di-monohydroxyaryl-alkane and an inert organic solvent. The phosgene is added in two portions, with the second portion being added at a rate slower than the first portion. The first portion consists of from 66⅔ to 91⅔ percent of the total phosgene content; and correspondingly the second portion consists of from 8⅓ to 33⅓ percent of the total phosgene content.

It has been found that best results are obtained when the second portion of phosgene is added to the reaction mixture at a rate less than 0.4 mole per hour per mole of di-monohydroxyaryl-alkane, and especially from 0.1 to 0.3 mole per hour.

The rate of addition of the first portion of phosgene must be greater than the rate in the second portion. It has been found that best results are obtained when the first portion of phosgene is added at a rate greater than 0.5 mole per hour per mole of di-monohydroxyaryl-alkane, and especially from 0.8 to 1.2 moles per hour.

In the di-monohydroxyaryl-alkanes to be used the two aryl radicals may be identical or different. Furthermore, the aryl radicals may contain substitutents which cannot react during the conversion into polycarbonates, such as halogen or alkyl groups, e.g., methyl, ethyl, propyl or tert-butyl groups. The alkyl radical of the di-monohydroxyaryl-alkanes linking the two benzene rings may consist either of an open chain or of a cycloaliphatic ring.

The following are examples of such di-monohydroxy-aryl-alkanes:

Bis-phenol–A,
(4,4'-dihydroxy-diphenyl)-methane,
1,1-(4,4'-dihydroxy-diphenyl)-cyclohexane,
1,1-(4,4'-dihydroxy-3,3'-dimethyl-diphenyl)-cyclohexane,
2,2-(2,2'-dihydroxy-4,4'-di-tert-butyl-diphenyl)-propane,
3,4-(4,4'-dihydroxy-diphenyl)-hexane,
1,1-(4,4'-dihydroxy-diphenyl)-1-phenyl-ethane,
2,2-(4,4'-dihydroxy-diphenyl)-butane,
2,2-(4,4'-dihydroxy-diphenyl)-pentane, 3,3-(4,4'-dihydroxy-diphenyl)-pentane,
2,2-(4,4'-dihydroxy-diphenyl)-3-methyl-butane,
2,2-(4,4'-dihydroxy-diphenyl)-hexane,
2,2-(4,4'-dihydroxy-diphenyl)-4-methyl-pentane,
2,2-(4,4'-dihydroxy-diphenyl)-heptane,
4,4-(4,4'-dihydroxy-diphenyl)-heptane, and
2,2-(4,4'-dihydroxy-diphenyl)-tridecane.

These compounds can easily be produced in conventional fashion by condensation of aldehydes or ketones with phenols.

Mixtures of the aforementioned di-monohydroxyaryl-alkanes may be advantageously employed.

The aqueous alkaline solution may be formed from an alkali metal base, preferably employing an excess of base, such as lithium, sodium, or potassium hydroxide. In the aqueous alkaline solution the alkali metal salt of di-monohydroxyaryl-alkane is formed; therefore, the alkali metal salt may be added directly to the aqueous alkaline solution instead of adding the individual components. The amount of caustic is not critical, it being required only to maintain an alkaline solution which is necessary for molecular weight growth. In theory two moles of caustic are required per mole of Bis-phenol–A for complete reaction of the Bis-phenol–A; in order to compensate for side reactions about 2.4 moles of alkali are employed and the normal operation requires about an additional 0.6 mole of excess alkali in order to provide the requisite alkaline solution. It has been found, surprisingly, that excellent results are obtained in the process of the present invention with as little as a total of 2.4 moles of caustic.

A catalytic amount of a reaction catalyst is preferably employed in the process of the present invention. Typical reaction catalysts include quaternary ammonium compounds, quaternary phosphonium compounds, tetra-aryl arsonium compounds and tertiary amines. The quaternary ammonium, phosphonium, and arsonium compounds may be in the form of a free base or in the form of a salt. The amount of catalyst is preferably from about 0.01 to about 5 percent by weight based on the di-monohydroxyaryl-alkane.

The preferred catalysts in the process of the present invention are the quaternary ammonium compounds, especially benzyl triethyl ammonium chloride; however, any of the compounds conventionally used as polycarbonate catalysts may be advantageously employed in the process of the present invention. Exemplicative catalysts include the following: quaternary ammonium compounds, such as tetramethyl ammonium hydroxide; octadecyl triethyl ammonium chloride; benzyl trimethyl ammonium fluoride; dodecyl trimethyl ammonium chloride; benzyl phenyl dimethyl ammonium chloride; cyclohexyl trimethyl ammonium bromide; and N-methyl pyridinium chloride: quaternary phosphonium compounds, such as tetramethyl phosphonium hydroxide; tetraethyl phosphonium chloride; hexyl trimethyl phosphonium bromide; benzyl trimethyl phosphonium fluoride; decyl triethyl phosphonium chloride; benzyl phenyl dimethyl phosphonium chloride; and cyclohexyl trimethyl phosphonium bromide: tetra-aryl arsonium compounds, such as tetraphenyl arsonium hydroxide; tetraphenyl arsonium chloride; tetranaphthyl arsonium bromide; and tetraphenyl arsonium chloride: tertiary amines, such as trimethyl amine; triethyl amine; and N-methyl morpholine.

The polymer should be soluble in the solvent which is employed, and the solvent should be substantially inert under the conditions of the reaction, immiscible in water and have a sufficiently high boiling point to allow for reaction at elevated temperatures, if desired. Generally speaking, it is preferred to employ a solvent which has a boiling point of from about 30° C. to about 80° C. The solvent is added prior to the introduction of phosgene, and added in amounts so that the final polymeric solution is fluid. The amount of solvent is not critical, but practically from two to 500 parts by weight of solvent based on the polycarbonate formed should be used. Typical solvents which may be employed include the following organic solvents: methylene chloride; ethylene chloride; benzene; methylcyclohexane; cyclohexane; toluene; xylene; chloroform; carbon tetrachloride; trichloroethylene; perchloroethylene; etc.

The minimum time of addition of the total phosgene content will naturally vary depending on the size of the run, the reaction conditions and whether or not the process is operated continuously. It has been found, however, that the best results are obtained when the time of addition of the total phosgene content is at least 30 minutes and not more than five hours. Naturally in a continuous operation the phosgene will be continuously introduced. In a continuous operation the reaction mixture is passed onto the subsequent reactor or reactors at convenient intervals for further phosgenation and/or post-phosgenation stirring.

After all of the phosgene has been introduced optionally a post-phosgenation stirring period may be employed. It is an advantage of the present invention that high molecular weights are obtained utilizing short post-phosgenation stirring periods, or no post-phosgenation stirring period at all. Long post-phosgenation stirring periods may, of course, be employed, if desired. The typical length of the post-phosgenation stirring period is from 15 minutes to two hours.

An additional advantage of the present invention is the avoidance of the high temperatures frequently encountered in conventional post-phosgenation stirring periods. Of course, elevated temperatures may be employed, if desired.

The temperature of the reaction may vary within a wide range, that is, the reaction may be conducted at room temperature or lower or higher temperatures as desired. Generally temperatures from the freezing point to the boiling point of the mixture may be utilized. In addition the reaction may be conveniently conducted at atmospheric pressure.

Potential chain terminators may be employed in the process of the present invention in order to limit the molecular weight. Typical of such compounds are phenol, tertiary butyl phenol, chlorophenol, nonyl alcohol, butyl alcohol, etc.

Various additives may be employed, such as antioxidants, and additives to preferentially react with phosgene decomposition products. Typical of such additives are sodium dithionite, potassium bisulfite, carbon monoxide, etc.

When the post-phosgenation stirring period has been completed, or if no post-phosgenation stirring period is employed, at the completion of phosgenation the polycarbonate resin may be recovered from the organic phase by conventional means, for example, by the addition of a non-solvent for the polycarbonate resin, thereby precipitating the polycarbonate from solution. Typical non-solvents include methanol, isopropanol, etc. Alternatively, the polycarbonate resin may be recovered by steam distillation or evaporation of the solvent.

The polycarbonates obtained by the present process have the desirable characteristics of polycarbonates, and may be easily processed into valuable formed articles or coatings by compression molding, extrusion, injection molding or flame spraying. The polycarbonates obtained by the present process can also be processed into films and fibers, which can be oriented by stretching. By this stretching operation the strength of these products is considerably increased, while elongation is decreased. The polycarbonates produced by the present process can also be processed in combination with plasticizers or with fillers, such as asbestos or glass fibers.

The present invention will be further illustrated by consideration of the following examples. In the following examples the molecular weight was determined as follows:

the dilute solution intrinsic viscosity of a 0.1 percent solution of the polymer in ethylene chloride was measured in Ostwald-Fenske viscometer at 25° C., and molecular weight calculated from the following equation wherein $\eta_i$ is viscosity:

$$\eta_i = 1.23 \times 10^{-4} MW^{0.83}$$

EXAMPLE 1

A 1-liter resin pot was fitted with a stirrer, reflux condenser, thermometer and gas inlet dip tube. The resin pot was charged with 500 cc. of water, 25.2 grams of caustic soda (95 percent NaOH) and 57 grams of Bisphenol–A producing a warm aqueous solution of sodium bisphenate. The solution cooled to room temperature, and 500 cc. of methylene chloride was added, followed by 6.4 cc. of benzyl triethyl ammonium chloride. Phosgene, 30 grams, was then slowly bubbled into the emulsion in two portions with stirring and cooling at 30° C. over a period of 2 hours, with 22.5 grams of the phosgene continuously introduced during the first hour (0.9 mole per hour) and 7.5 grams continuously introduced during the second hour (0.3 mole per hour). The final emulsion was separated and methylene chloride solution of polymer was washed with dilute HCl and water, precipitated by drop-wise addition of 400 cc. of acetone and 500 cc. of methanol with stirring, filtered and dried overnight at 120° C. The resulting polymer was found to have a molecular weight of 84,000.

In the following table the procedure of Example 1 was repeated, except as indicated.

(II) adding phosgene thereto in two portions,
  (a) the first portion containing from about 66⅔ to 91⅔ percent of the total amount of phosgene and being added at a rate of from about 0.5 to 1.2 mols phosgene per hour per mol di-monohydroxyaryl-alkane;
  (b) the second portion containing from about 8⅓ to 33⅓ percent of the total amount of phosgene and being added at a rate of from about 0.04 to 0.4 mol phosgene per hour per mol di-monohydroxyaryl-alkane and
(III) recovering the resulting polycarbonate resin.

2. A process according to claim 1 wherein from 1.1 to 1.5 moles of phosgene are employed per mole of di-monohydroxyaryl-alkane.

3. A process according to claim 2 wherein the reaction is conducted in the presence of a catalyst.

4. A process according to claim 3 wherein from 0.01 to 5.0 percent by weight of a quaternary ammonium compound is employed as a catalyst.

5. A process according to claim 4 wherein said catalyst is benzyl triethyl ammonium chloride.

6. A process according to claim 3 wherein said phosgenation period is followed by a post-phosgenation stirring period.

7. A process according to claim 3 wherein said di-monohydroxyaryl-alkane is 2,2-(4,4′-dihydroxydiphenyl)-propane.

Table 1

| Example No. | Grams of Phosgene Added During First Hour | Mole Per Hour Rate of Phosgene During First Hour | Grams of Phosgene Added During Second Period | Length of Second Period in Hours | Mole Per Hour Rate of Phosgene During Second Period | Molecular Weight |
|---|---|---|---|---|---|---|
| 2 | 20.0 | 0.8 | 10.0 | 1.0 | 0.4 | 67,000 |
| 3 | 27.5 | 1.1 | 2.5 | 1.0 | 0.1 | 110,000 |
| 4 | 30.0 | 1.2 | 0.0 | 1.0 | | 30,000 |
| 5 | 25.0 | 1.0 | 5.0 | 0.2 | 1.0 | 40,000 |
| 6 | 25.0 | 1.0 | 5.0 | 1.0 | 0.2 | 93,000 |
| 7 | 25.0 | 1.0 | 5.0 | 5.0 | 0.04 | 91,000 |

This present invention may be embodied in other forms or carried out in other ways without departing from the spirit or essential characteristics thereof. The present embodiment is, therefore, to be considered as in all respects illustrative and not restrictive, the scope of the invention being indicated by the appended claims and all changes which come within the meaning and range of equivalency are intended to be embraced therein.

We claim:
1. A process for the preparation of a polycarbonate resin which comprises
  (I) preparing an aqueous alkaline solution containing a di-monohydroxyaryl-alkane and an inert organic solvent immiscible with the aqueous phase,

References Cited by the Examiner

UNITED STATES PATENTS 2,950,266  8/60  Goldblum _____ 260—47
2,970,131  1/61  Moyer et al. _____ 260—47
3,030,331  4/62  Goldberg _____ 260—47

FOREIGN PATENTS 772,627  4/57  Great Britain.

WILLIAM H. SHORT, Primary Examiner.

HAROLD N. BURSTEIN, LOUISE P. QUAST, Examiners.